United States Patent [19]
Kase et al.

[11] Patent Number: 6,047,340
[45] Date of Patent: Apr. 4, 2000

[54] METHOD FOR TRANSMITTING DATA, AND APPARATUS FOR TRANSMITTING DATA AND MEDIUM

[75] Inventors: Hiroshi Kase, Moriguchi; Shinji Hamai, Osaka; Yoshihiro Morioka, Kashiba, all of Japan

[73] Assignee: Matsushita Electric Industrial Co., Ltd., Osaka, Japan

[21] Appl. No.: 08/975,533

[22] Filed: Nov. 20, 1997

[30] Foreign Application Priority Data

Nov. 20, 1996 [JP] Japan .................................. 8-308903

[51] Int. Cl.⁷ .................................................. G06F 13/00
[52] U.S. Cl. ................................ 710/60; 710/29; 710/52
[58] Field of Search ................................ 710/29, 30, 33, 710/52, 58, 60, 65, 66, 127

[56] References Cited

U.S. PATENT DOCUMENTS

| | | | |
|---|---|---|---|
| 4,489,378 | 12/1984 | Dixon et al. | 364/200 |
| 5,394,528 | 2/1995 | Kobayashi et al. | 395/325 |
| 5,410,672 | 4/1995 | Sodek, Jr. et al. | 395/425 |
| 5,535,208 | 7/1996 | Kawakami et al. | 370/84 |
| 5,555,380 | 9/1996 | Suzuki | 395/250 |
| 5,640,602 | 6/1997 | Takase | 395/855 |
| 5,745,789 | 4/1998 | Kakuta | 395/841 |

FOREIGN PATENT DOCUMENTS

| | | |
|---|---|---|
| 0255593A2 | 10/1988 | European Pat. Off. . |
| 8-205078A | 8/1996 | Japan . |
| WO 93/12486 | 6/1993 | WIPO . |
| WO 94/17476 | 8/1994 | WIPO . |

Primary Examiner—Ayaz R. Sheikh
Assistant Examiner—Jigar Pancholi
Attorney, Agent, or Firm—Ratner & Prestia

[57] ABSTRACT

A method for transmitting data when a system detects the amount of data which can be transferred, and divides the data to be transferred into a plurality of data blocks to form a list. A transfer device refers to the list and carries out input and output processing between a VTR or a network and a memory. Thus, the data can be efficiently transmitted at high speed with high reliability and independent of system configuration. Additionally, the data can be rearranged in the course of its transmission.

35 Claims, 11 Drawing Sheets

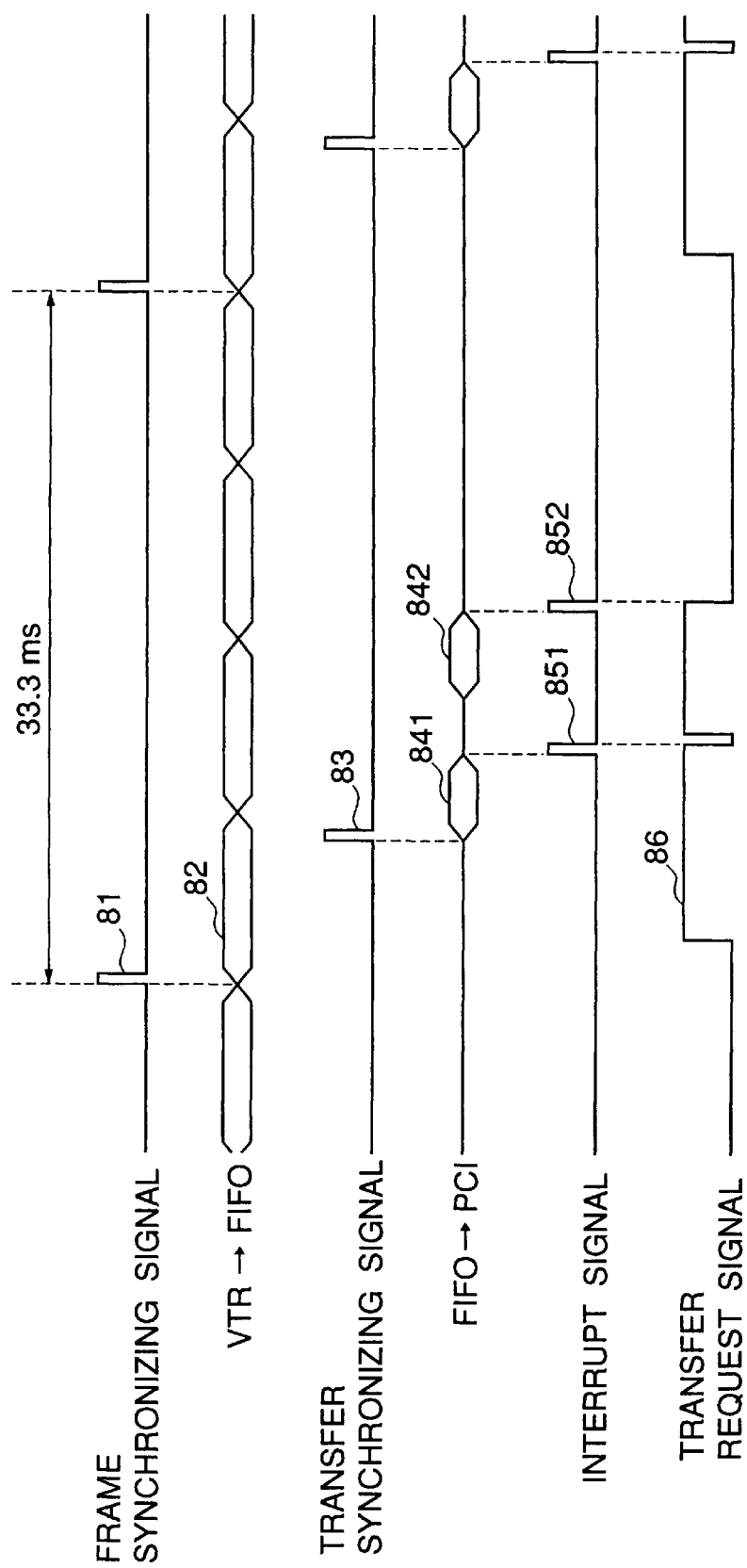

FIG. 10
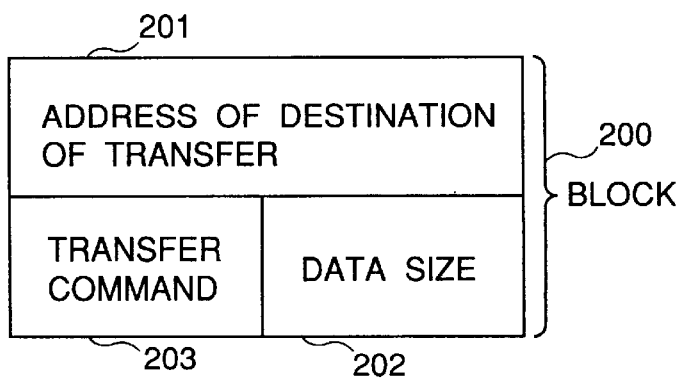
FIG. 11
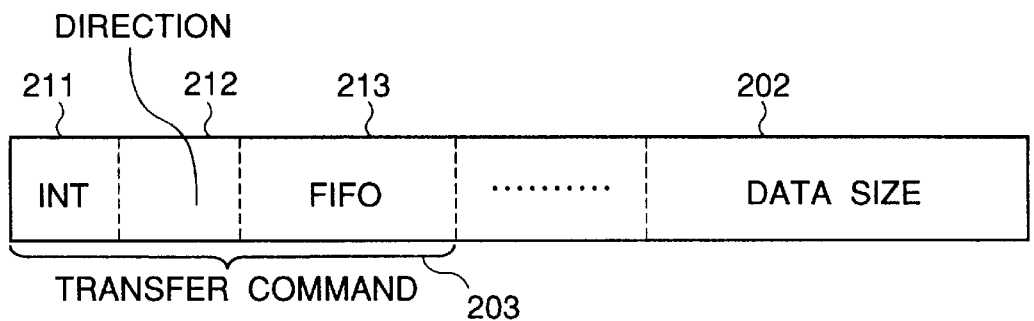
FIG. 12
| | | |
|---|---|---|
| | 0 | ⎱ FIRST BLOCK |
| 0100 | 4000 | |
| | 4000 | ⎱ SECOND BLOCK |
| 0101 | 4000 | |
| | 8000 | ⎱ THIRD BLOCK |
| 0110 | 4000 | |
| | ⋮ | |
| | 56000 | ⎱ 15TH BLOCK |
| 1110 | 4000 | |

|      | 0     |
|------|-------|
| 0100 | 8000  |
|      | 16000 |
| 0100 | 4000  |
|      | 8000  |
| 0100 | 8000  |
|      | 20000 |
| 1000 | 4000  | ns

METHOD FOR TRANSMITTING DATA, AND APPARATUS FOR TRANSMITTING DATA AND MEDIUM

BACKGROUND OF THE INVENTION

1. Field of the Invention

The present invention relates to a method for transmitting data, and an apparatus for transmitting data and a medium which can be used when for example, data representing video images, data representing sound and auxiliary data except them are inputted and outputted between an information recording and reproducing device and a computer.

2. Description of the Related Art

A device (VTR, video cameras, hard disks, optical disks or the like) for recording or reproducing information such as video images and sound has been connected to a computer through an exclusive interface or a network and data has been transmitted. Thus, an editing operation for the video images, sound or the like has been carried out on the computer. This technique for the recording and reproducing device is proposed by Japanese Patent Application No. 8-176934.

However, depending on the system configuration of a hardware or a software such as an operating system in a computer, the amount of data capable of being transmitted within a unit time which is assigned to each of various processings of an entire data transfer rate respectively changes. Therefore, there has occurred a problem that if the system configuration changes, a phenomenon in which it is impossible to transmit data or a reproduced video image is dropped out of a frame or the like occurs, or the data of an amount smaller than that which can be actually transmitted can be only transmitted with an efficiency lowered. Further, there has also arisen a problem that each time the system configuration changes, it is necessary to change a hardware or software.

In addition, there has occurred a defect that if the data is simultaneously edited while the data is transmitted, the data to be transmitted can not be fetched by mistake.

Still further, there has been proposed a method that when an excess transfer amount of the bus of a computer is compared with a requested transfer amount and the requested transfer amount exceeds the excess transfer amount, the request is stood by, and then, when the excess transfer amount recovers, the data is transferred.

However, according to this method, even when the excess transfer amount of the bus remains or is left, if the requested transfer amount exceeds the former, the request must be waited for. Therefore, the excess part of the bus is undesirably wasted.

SUMMARY OF THE INVENTION

The present invention was made in order to solve the above-mentioned problems of prior art and it is an object of the present invention to provide a method for transmitting data, an apparatus for transmitting data and a medium by which data can be efficiently transmitted to an information recording and reproducing device at high speed without depending on a system configuration.

It is another object of the present invention to provide a method for transmitting data, an apparatus for transmitting data and a medium capable of more improving a reliability.

A method for transmitting data of the first exemplary embodiment comprises an input and output step for inputting and/or outputting prescribed data receiving a transfer request by an input and output means; a storing step for temporarily storing the prescribed data in a memory; a transmitting step for transmitting the data between the input and output means and the memory; and a control step for examining the amount of data which can be transferred per one unit transfer when the data is transmitted based on the transfer request, dividing the prescribed data into data blocks respectively having the size or capacity which does not exceed the amount of data capable of being transferred when the amount of the prescribed data exceeds the amount of data which can be transferred, and respectively transmitting a single or plurality of the divided data blocks as said one unit transfer to be transferred.

An apparatus for transmitting data of the second exemplary embodiment comprises an input and output means for inputting and outputting data including at least one of video data, sound data and/or auxiliary data as first data; a memory for storing the first data; a transmitting means for transmitting the data between said input and output means and said memory; a first controller for controlling the transmission of the data between said input and output means and said memory; and a second controller for detecting the amount of data which can be transferred as one unit transfer through said transmitting means when said first data is transmitted, and controlling at least said input and output means, said memory, and said first controller so as to divide the first data into data blocks respectively having the size or capacity which does not exceed said amount of data and respectively transmit a single or plurality of the divided data blocks as said one unit to be transferred when the first data exceeds said amount of data which can be transferred.

An apparatus for transmitting data of the third exemplary embodiment according to said 2nd invention, further comprises a list forming means for forming a list showing at least the respective amount of data of the data blocks, which is used when the data is divided into the data blocks; and a transfer means in the input and output means or the second controller for transferring the first data divided into the data blocks to said transmitting means based on the contents of said list.

An apparatus for transmitting data of the fourth exemplary embodiment according to said second or third exemplary embodiment, wherein said input and output means comprises a first buffer for temporarily storing said first data; a second buffer for temporarily storing said first data having a bit width different from that of the data in the first buffer; a first interface for converting the bit width between the first buffer and the second buffer and inputting and outputting the first data; and a second interface for inputting and outputting the first data between the second buffer and the transmitting means in accordance with a signal from the transmitting means.

An apparatus for transmitting data of the fifth exemplary embodiment according to any one of said second through fourth exemplary embodiments, is characterized by that said input and output means is also connected to an external data input and output device and said first data is recorded on said data input and output device and/or reproduced by said data input and output device.

An apparatus for transmitting data of the sixth exemplary embodiments according to said fifth exemplary embodiment, is characterized by that said data input and output device generates a first synchronizing signal; said first interface inputs and outputs the data synchronously with the first buffer in accordance with the generated first synchronizing signal and further generates a second synchronizing signal relative to said second interface; and said second interface inputs and outputs the data synchronously with said transmitting means in accordance with the generated second synchronizing signal, and further, inputs and outputs the data to said transmitting means when a data transfer is requested from the transmitting means.

An apparatus for transmitting data of the seventh exemplary embodiment according to said fifth or sixth exemplary embodiment, is characterized by that assuming that N is an integer not smaller than 2, said data input and output device generates one synchronizing signal during the period of one frame and further inputs and outputs the first data for N frames during the period of one frame.

An apparatus for transmitting data of the eighth exemplary embodiment according to said fifth or sixth exemplary embodiment, is characterized by that said data input and output device is a recording and reproducing device capable of recording and reproducing the data of a DVC form at a speed four times as fast as an ordinary speed.

An apparatus for transmitting data of the ninth exemplary embodiment according to any one of said second through eighth exemplary embodiment, wherein said input and output means is an interface for converting the data of a DVC form into the data of a PCI bus form or data of the PCI bus form into data of the DVC form.

An apparatus for transmitting data of the tenth exemplary embodiment according to any one of said second through eighth embodiments, is characterized by that said input and output means is an interface for converting data transmitted through a network into the data of a PCI bus form or the data of the PCI bus form into the data transmitted through the network.

An apparatus for transmitting data of the eleventh exemplary embodiment according to any one of said second to eighth exemplary embodiments, is characterized by that said memory is a main memory of a computer.

An apparatus for transmitting data of the twelfth exemplary embodiment according to any one of said second to eighth exemplary embodiment, is characterized by that said transmitting means is a PCI bus.

An apparatus for transmitting data of the thirteenth exemplary embodiment according to any one of said second to eighth exemplary embodiments, is characterized by that said first controller is a microprocessor.

An apparatus for transmitting data of the fourteenth exemplary embodiment according to any one of said second to eighth exemplary embodiment, is characterized by that said second controller employs an application software, a device driver or an operating system.

An apparatus for transmitting data of the fifteenth exemplary embodiment according to any one of said third to eighth exemplary embodiments, is characterized by that said list is formed in said memory or said input and output means.

An apparatus for transmitting data of the sixteenth exemplary embodiment according to any one of said third to eighth exemplary embodiments, is characterized by that said list can be made access to from said input and output means.

An apparatus for transmitting data of the seventh exemplary embodiment according to any one of said third to eighth exemplary embodiments, is characterized by that said list includes the address information of the end of data transfer of the data blocks in addition to said respective amount of data when the respective data blocks are transmitted from said input and output means to said memory, and also includes the address information of the start of data transfer of the data blocks in addition to said respective amount of data when the respective data blocks are transmitted from the memory to said input and output means.

An apparatus for transmitting data of the eighteenth exemplary embodiments according to said seventeenth exemplary embodiment, is characterized by that said list is so formed as to make the arrangement of the first data in said input and output means or said second interface different from that of the data in said memory corresponding thereto in view of its contents, as a result of the transmission of the data blocks.

An apparatus for transmitting data of the nineteenth exemplary embodiment according to any one of said third to said eighth exemplary embodiments, is characterized by that said list has in its contents a command for controlling said input and output means or said second interface.

A medium records a program for carrying out all or a part of the steps of the twentieth exemplary embodiment according to said first exemplary embodiment by a computer.

A medium records a program for carrying out the functions of all or a part of the respective means of the twenty-first exemplary embodiment according to any one of said second to nineteenth exemplary embodiments by a computer.

Since the present invention has the above-mentioned construction, the invention can provide an advantage that the transfer capacity of a system inherent in the system can be employed more efficiently, without depending on the system configuration, than conventional method and apparatus and medium.

Further, according to the above-mentioned construction, the method for transmitting data, an apparatus for transmitting data and the medium of the present invention can desirably transmit data more efficiently and achieve a high speed transmission with a higher reliability than those of the prior art.

Besides, in the method and apparatus and the medium of the present invention, a processing time for arranging or listing data can be desirably much shortened as compared with those of the prior art.

BRIEF DESCRIPTION OF THE DRAWINGS

The present invention will now be described, by way of examples, with reference to the accompanying drawings, in which:

FIG. 8 is a timing chart showing a data transfer in the fifth embodiment;

FIG. 10 is a view showing a configurational example of the block of a list in the fifth embodiment;

FIG. 11 is a view showing a configurational example of a transfer command of the list in the fifth embodiment;

FIG. 12 is a view showing a specific example of a list 13 in the fifth embodiment;

DESCRIPTION OF THE PREFERRED EMBODIMENTS

A description will be given to embodiments of the present invention by referring to the accompanying drawings.

(First Embodiment)

Figure 1:
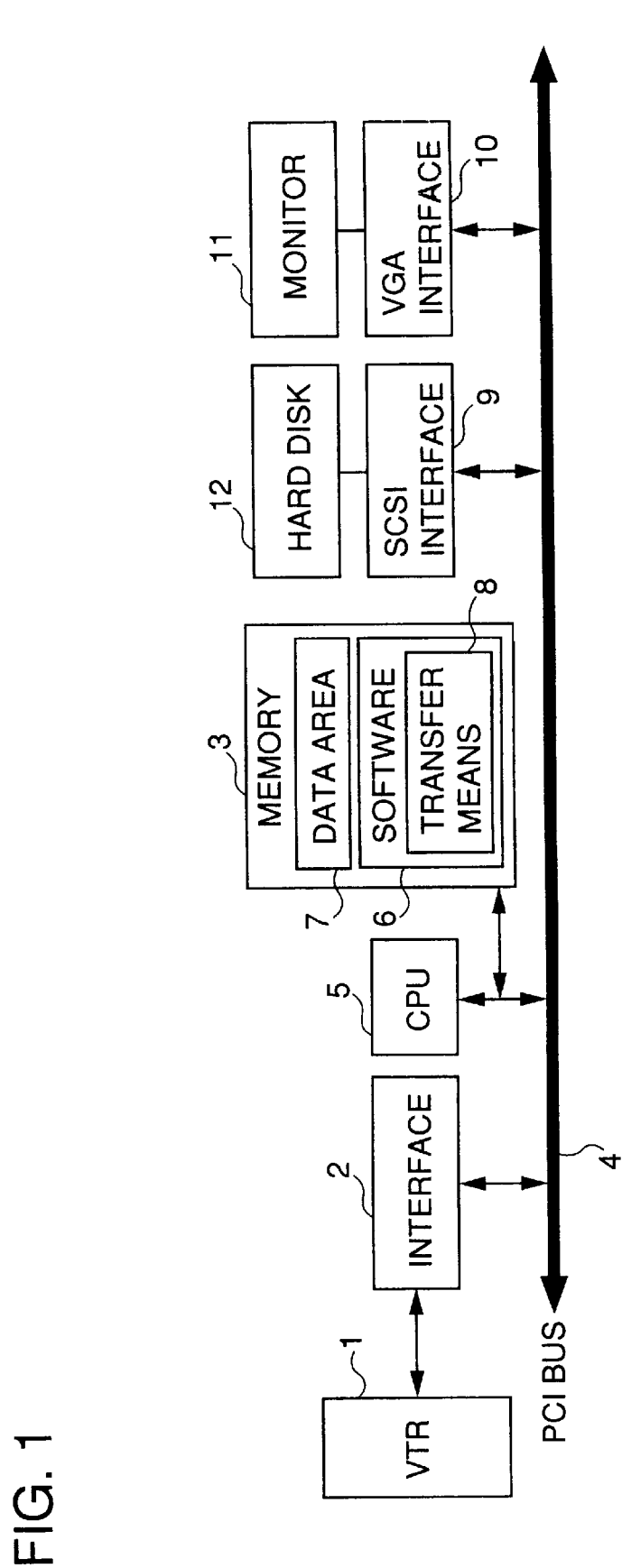
FIG. 1 is a block diagram of a system showing a first embodiment of the present invention.

FIG. 1 is a block diagram of a system showing a first embodiment of the present invention. With reference to FIG. 1, the configuration and the operation of the first embodiment according to the present invention will be described below. In FIG. 1, a VTR 1 is a means for recording and reproducing video data, sound data, and data of a DVC format including other auxiliary data (The DVC format is disclosed in Japanese Patent Application No. 8-17693 or the like).

An interface 2 is an interface between the VTR 1 and a PCI bus 4 and serves as a means for converting data outputted from the VTR 1 into a PCI bus form. The data on the PCI bus 4 is controlled by a software 6 on a memory 3 and a CPU 5 and transmitted to the data area 7 of the memory 3 in the form of a unit of datablock, which will be described hereinafter. The software 6 has a transfer means 8 for detecting the amount of data which can be transferred through the PCI bus 4 and dividing data receiving a request for transfer into data blocks with the capacity which does not exceed the amount of data capable of being transferred. Further, the data is also transmitted to the VTR 1 from the data area 7 in a sequence opposite to that mentioned above.

Further, the data of the data area 7 is processed by the software 6 and then, can be outputted to a monitor 11 through a VGA interface 10 connected to the PCI bus 4. The data can be also inputted to and outputted from a hard disk 12 through an SCSI interface 9 connected to the PCI bus 4.

A user can employ a keyboard or a mouse not illustrated so that he or she can carry out the above-mentioned operations.

Incidentally, although the PCI bus is employed in the first embodiment, it is to be noted that other bus such as an ISA bus may be used.

Further, while, the VTR is used as the recording and reproducing device, it is to be understood that other recording and reproducing device such as an optical disk or a hard disk may be used.

Still further, the recording and reproducing device may not be used and a network may be used.

Additionally, while, the data of a known DVC format is utilized, it is to be noted that the present invention is not limited thereto, and the data of other format may be utilized.

In addition, as the software 6, any one of an application program, a device driver and an operating system may be used.

Besides, it is to be recognized that other interface such as IDE, EIDE or the like may be used in place of the SCSI interface to the hard disk 12.

Figures 2, 4:
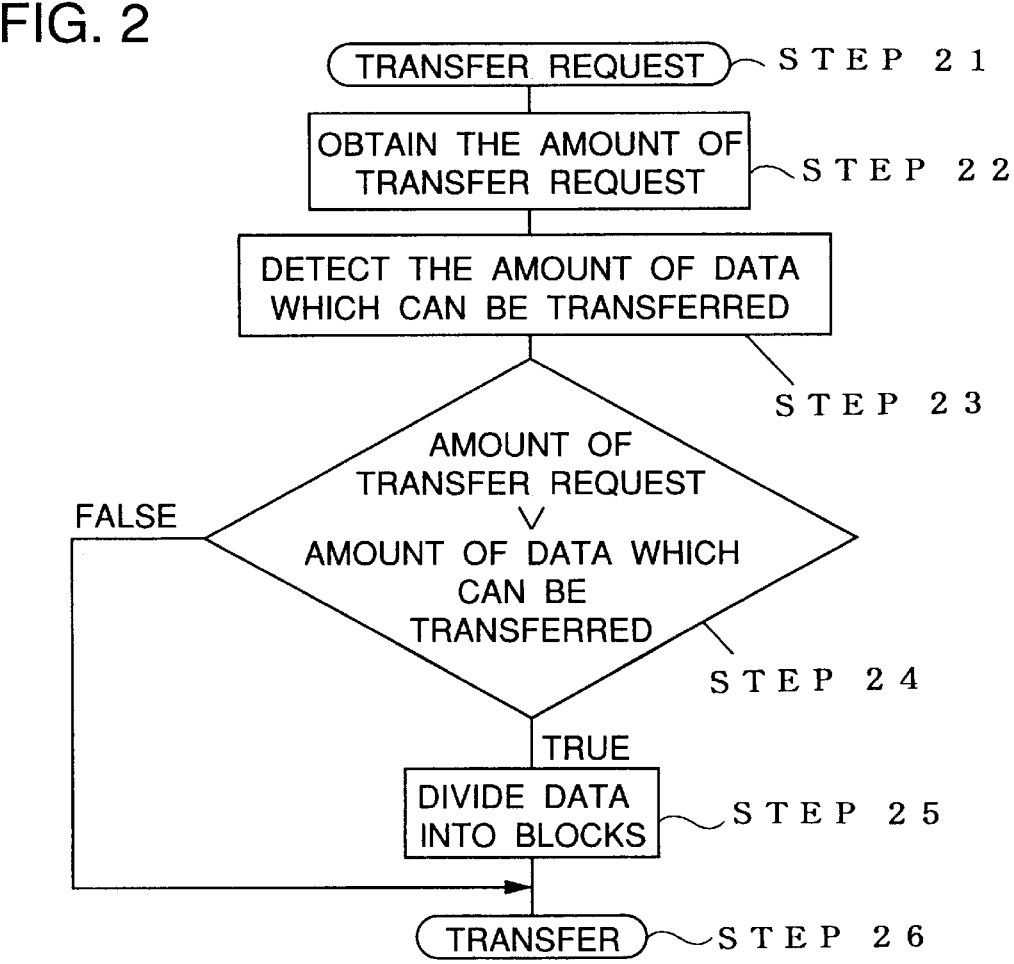
FIG. 2 is a flowchart showing an example of the operation of a software 6 in the first embodiment.
FIG. 4 is a view showing an example of the form of a list 13 according to the second embodiment.

FIG. 2 is a flowchart showing an example of the operation of the software 6.

When the software 6 receives a transfer request of data (step 21), the software 6 gains the amount of the transfer request for data (step 22) and the amount of data capable of being transferred which is allowable by the bus (step 23). The gaining of the amount of data which can be transferred will be described later. Then, the amount of the transfer request for data is compared with the amount of data which can be transferred in view of their capacity (step 24). When the amount of data which can be transferred is lower than the amount of the transfer request for data, the requested data is divided into data blocks respectively having the size of data which does not exceed the amount of transferable data (step 25). Each block of a plurality of the divided data blocks is regarded as one unit for transferring data (this is called one unit transfer) and transmitted (step 26). Otherwise, all the requested data is transferred at the same time.

In this connection, the amount of transferable data may be obtained from a function prepared for an operating system or may be calculated from a memory area secured for transferring data through the bus, that is, the amount of an unused part of the data area 7 illustrated in FIG. 1.

Now, the division of the data block will be described in more detail hereinafter.

In the above-mentioned embodiment of the present invention, the amount of data which can be transferred per unit transfer is determined depending on the relation between a period of one unit transfer and a bit rate (this means a data transfer rate) per unit time which are predetermined by a system configuration or the like. Therefore, when the amount of data to be transferred exceeds the predetermined amount of data transferable, the data to be transferred is divided into a plurality of data blocks, as mentioned above. In such cases as mentioned below, it may be possibly necessary to divide the data into the data blocks.

Specifically, there is mentioned a first case in which, although the amount of data itself to be transferred is located within a range of the predetermined amount of data which can be transferred, the data transfer rate of the data to be transferred exceeds a reference predetermined by the above-mentioned system configuration or the like. In this case, the bit rate needs to be changed so that the data transfer rate of the data to be transferred reaches not higher than the above-mentioned reference. As a result of a changing treatment, when the period required for transferring the data exceeds the reference of the predetermined period, the data to be transferred is divided into a plurality of data blocks. Thus, the amount of data of one of the divided data blocks satisfies the conditions of the amount of transferable data and can be transferred without difficulty.

In addition, when the data to be transferred is divided into a plurality of datablocks, if the unit length of the divided data block is shortened, a plurality of data blocks can be transmitted within one unit transfer. It should be noted that, when the period required for transferring the data does not exceed the reference of the predetermined period, as a result of a changing process, the data to be transferred may not be divided into a plurality of data blocks without a problem.

As a second case, when the amount of data itself to be transferred exceeds the predetermined amount of transferable data, the second case is further divided into two instances.

As one of the instances, the data transfer rate of the data to be transferred exceeds the reference of the predetermined data transfer rate. In this case, the data to be transferred may be divided into a plurality of data blocks similarly to the first case.

As the other of the instances, while the data transfer rate of the data to be transferred does not exceed the above-mentioned reference, the length of the data exceeds the above-mentioned period. In this case, the changing process of the data transfer rate is not needed but the data may be divided into a plurality of data blocks so that they are located within a period of one unit transfer.

The above-mentioned division of the data block may be similarly applied to all the embodiments which will be described below.

(Second Embodiment)

Figure 3:
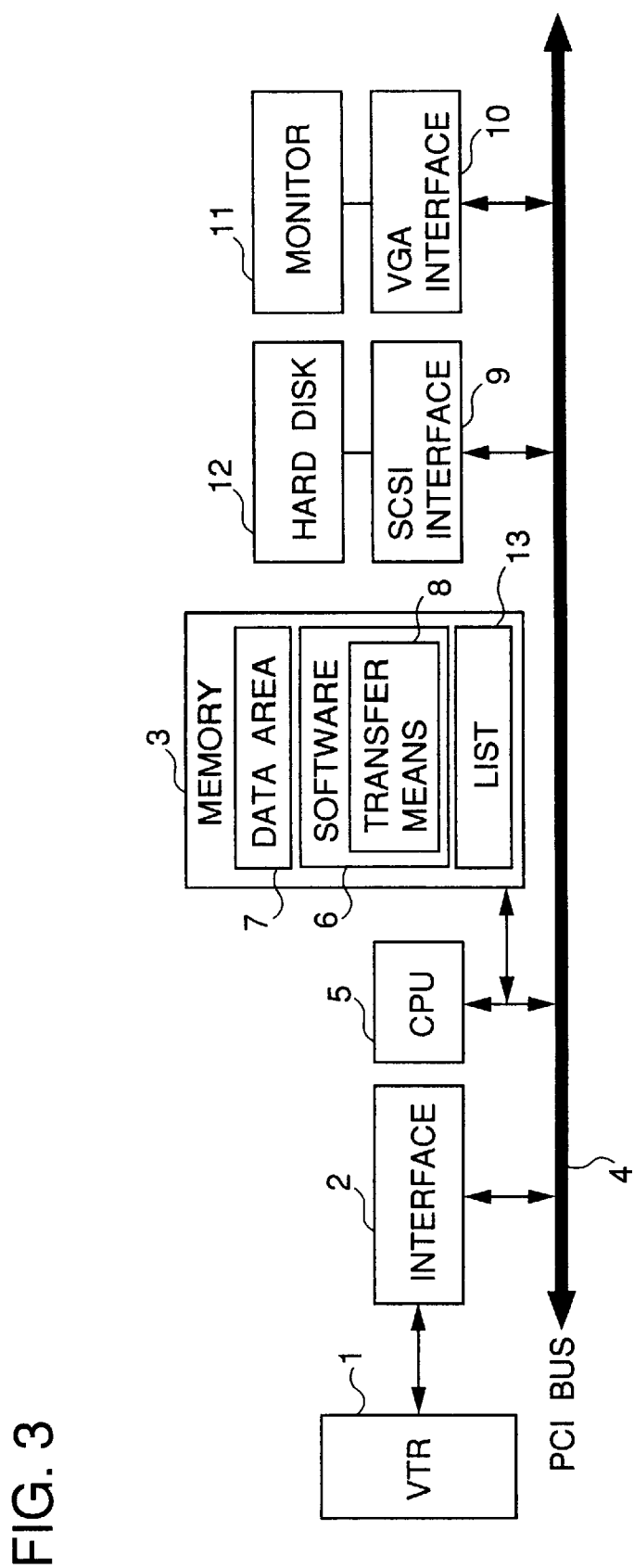
FIG. 3 is a block diagram of a system showing a second embodiment according to the present invention.

FIG. 3 is a system block diagram showing a second embodiment of the present invention. The construction and operation of the second embodiment will be described by referring to FIG. 3.

In FIG. 3, parts the same as those shown in FIG. 1 are indicated by the same reference numerals as those in FIG. 1 and the explanation thereof will be omitted.

A list 13 is formed by a software 6. When data needs to be divided into a plurality of data blocks as stated in the first embodiment, the list 13 stores the first addresses (the addresses of the destination of data transfer or the addresses of the start of data transfer) and the sizes (data sizes) of the divided blocks as a list. As a form of the list, for instance, an example as shown in FIG. 4 may be exemplified. However, any form which can be made access to from the software 6 may be employed. The formation of the list will be further explained in other embodiments mentioned below.

For example, when data is transferred from a VTR1 to a memory 3, the first addresses (corresponding to addresses in the memory 3 serving as the destination of data transfer) and the sizes of the divided blocks of the formed list 13 are sequentially read by a transfer means 8. In response thereto, a CPU5 transmits the data of the VTR 1 to the memory 3 through an interface 2 and a PCI bus 4 so that the data is stored in the address of the destination of data transfer for each of the divided blocks.

On the other hand, when the data is transferred from the memory 3 to the VTR 1, the first addresses (corresponding to addresses in the memory 3 serving as the start of data transfer) and the sizes of the divided blocks of the formed list 13 are sequentially read by the transfer means 8, so that the CPU 5 reads the data block with a relevant size from the relevant address in the memory 3, and transmits it to the interface 2 through the PCI bus 4.

(Third Embodiment)

Figure 5:
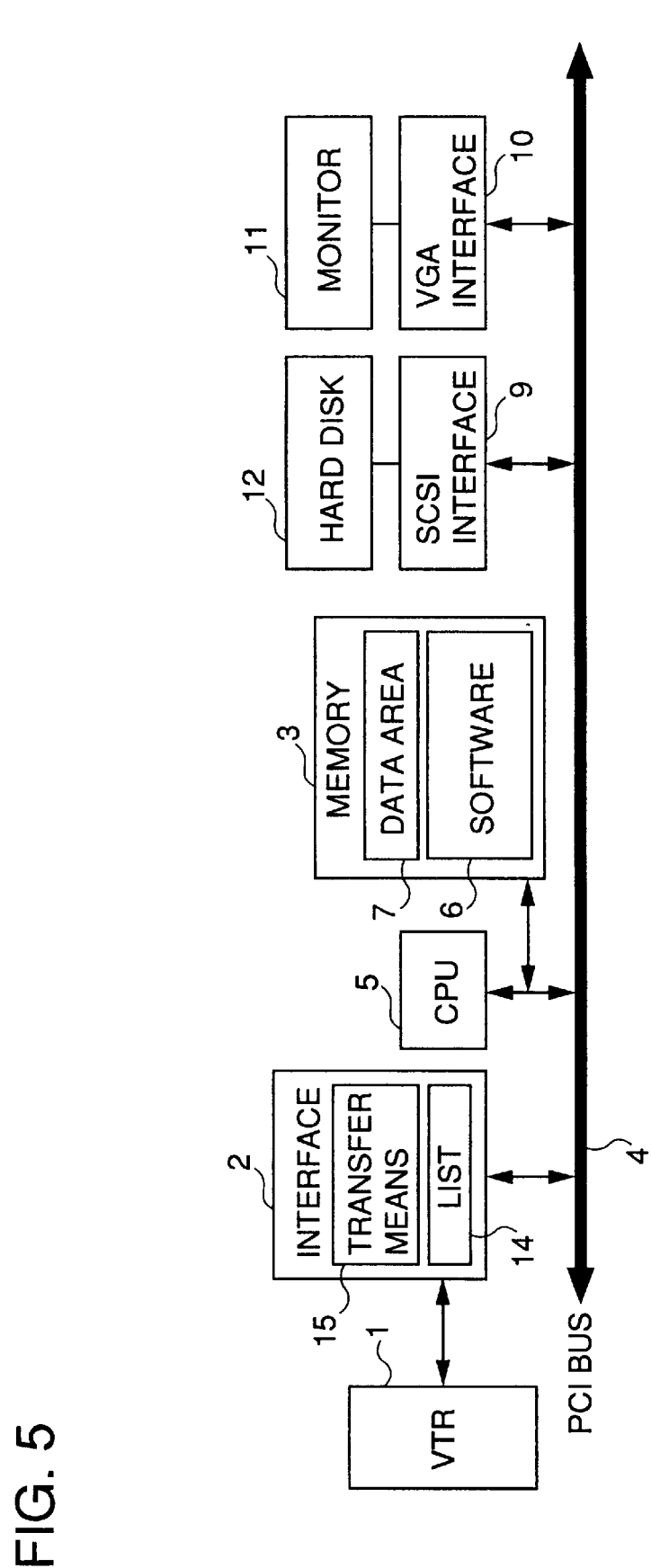
FIG. 5 is a block diagram of a system showing a third embodiment of the present invention.

FIG. 5 is a system block diagram showing a third embodiment of the present invention.

In FIG. 5, the explanation of parts designated by the same reference numerals as those shown in FIG. 1 will be omitted.

A list 14 and a transfer means 15 are provided in an interface 2. Information showing the first addresses and sizes of the divided blocks of data to be transferred is formed in the list 14 in the form of a list by a software 6, so that a list similar to that illustrated in the second embodiment is constituted. For instance, an explanation is given to a case where data is transferred from a VTR 1 to a memory 3. The transfer means 15 refers to the address of the destination of data transfer assigned to each of the divided blocks shown in the list 14 and transfers the data with the size assigned to each of the divided blocks, as one unit, to the above-mentioned address in a data area 7 in the memory 3 through the interface 2 from the VTR 1. Since the data is transmitted by the transfer means 15 (generally, this is referred to as a DMA transfer), the CPU 5 can perform other processings during that time, so that an extremely efficient operation can be provided to a user. Conversely, when the data is transferred to the VTR 1 from the memory 3, operations to be carried out are basically equal to those described in the second embodiment.

(Fourth Embodiment)

Figure 6:
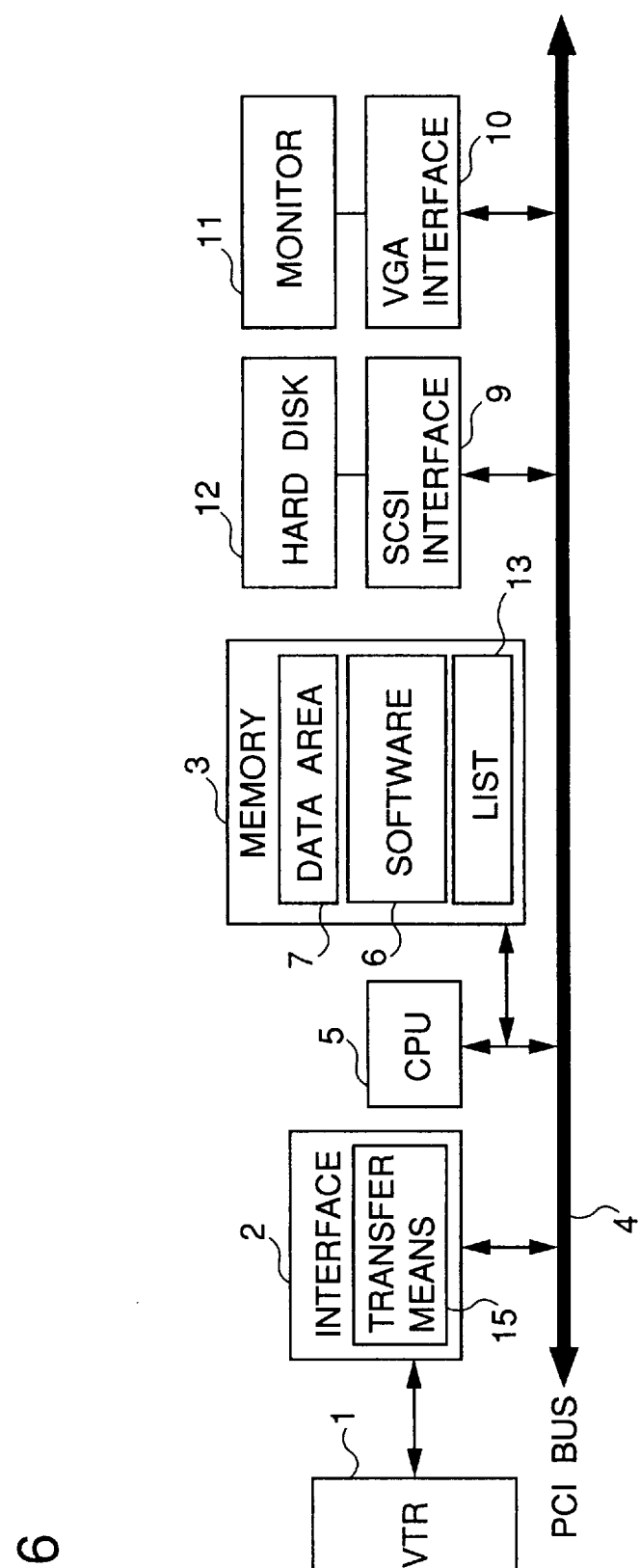
FIG. 6 is a block diagram of a system showing a fourth embodiment of the present invention.

FIG. 6 is a system block diagram showing a fourth embodiment of the present invention.

In FIG. 6, components corresponding to those indicated by the same reference numerals shown in FIG. 1 will not be explained.

A list 13 is formed in a memory 3 by a software 6 and can be made access to from a transfer means 15 provided in an interface 2. The contents of the list to be formed are similar to the form of the list shown in the second embodiment.

When data is transmitted, the transfer means 15 refers to the contents of the list 13 and transmits the data without using a CPU 5, which is a similar way to that of the third embodiment.

(Fifth Embodiment)

Figure 7:
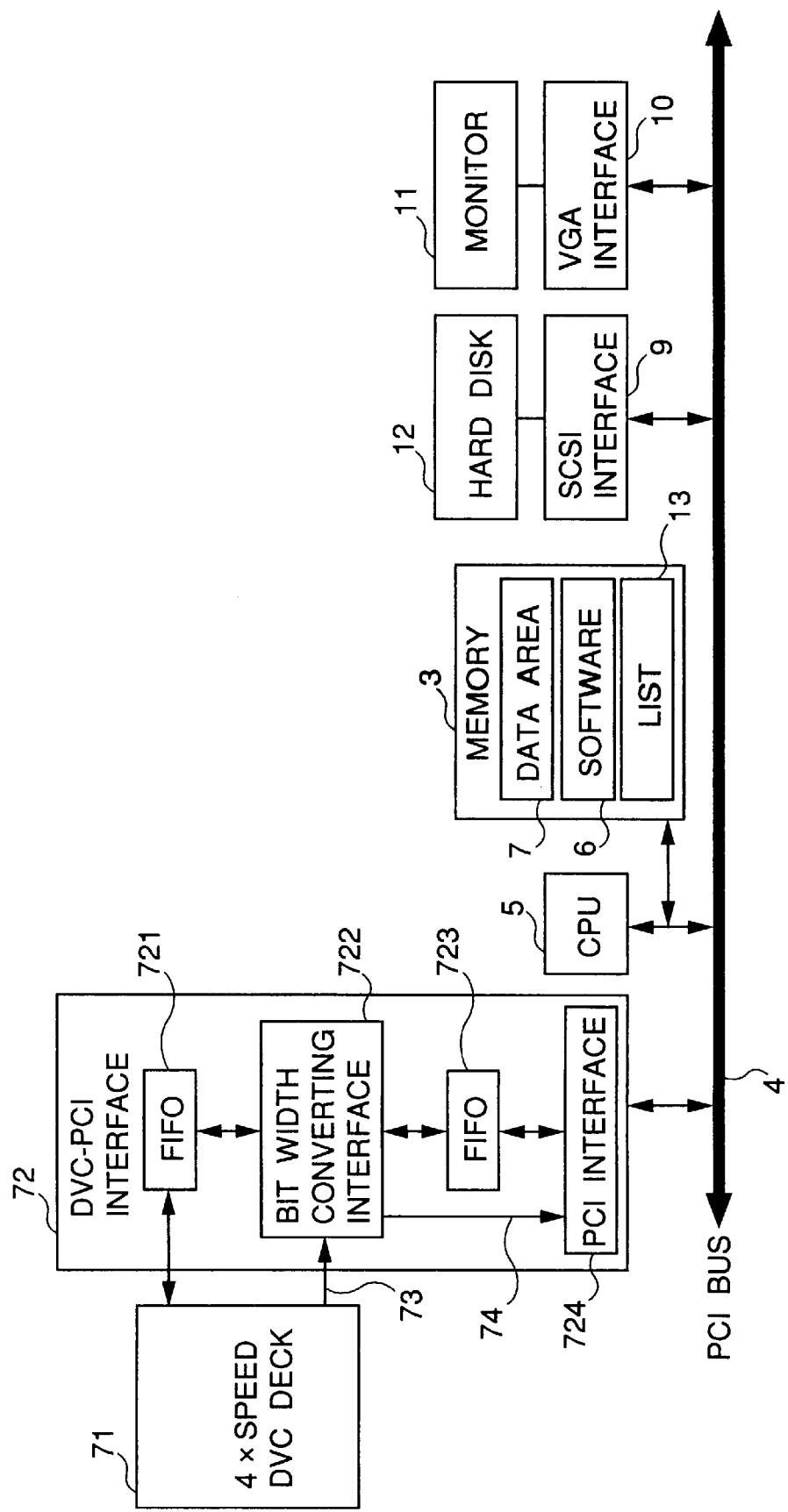
FIG. 7 is a block diagram of a system showing a fifth embodiment of the present invention.

FIG. 7 is a system block diagram showing a fifth embodiment of the present invention.

In the fifth embodiment of the present invention, an entire system construction is similar to that of the fourth embodiment illustrated in FIG. 6. The VTR 1 in FIG. 6 corresponds to a 4×speed DVC deck 71 shown in FIG. 7. The interface 2 shown in FIG. 6 corresponds to a DVC-PCI interface 72 in FIG. 7.

The 4×speed DVC deck 71 can record and reproduce a DVC signal at speed four times as fast as an ordinary speed, and input and output DVC data for four frames for a period of one frame (1/30 second). Further, the 4×speed DVC deck 71 corresponds to a DVC signal form and the capacity of the DVC signal for one frame is 120000 bytes (expressed as 120 kB, hereinafter).

Therefore, the 4×speed DVC deck 71 can input and output the data with the capacity of 480 kB for the period of one frame. The data supplied and received between the 4×speed DVC deck 71 and the DVC-PCI interface 72 has a width of 8 bits and is temporarily stored in an FIFO 721 in the course of input and output. A bit width converting interface 722 is an interface interposed between the FIFO 721 for the data of 8-bit width and an FIFO 723 for the data of 32-bit width and converts the bit width of data inputted and outputted into 32 bits from 8 bits and vice versa. A PCI interface 724 is an interface for controlling the input and output of data between a PCI bus 4 and the FIFO 723 in FIG. 7. The PCI interface 724 has a function corresponding to that of the transfer means 15 illustrated in FIG. 6. The PCI interface 724 makes access to information corresponding to that of the list 13 in FIG. 7, so that it can obtains the destination of data transfer and a transfer data size and transmit data, synchronously with the 4×speed DVC deck 71.

The 4×speed DVC deck 71 further generates a frame synchronizing signal 73 in order to take the synchornization with the transmission of data. This signal is generated every period of one frame (1/30 second=about 33.3 ms) and inputted to the bit width converting interface 722 of the DVC-PCI interface 72. The bit width converting interface 722 refers to the frame synchronizing signal 73, generates a transfer synchronizing signal 74 as a new synchronizing signal and inputs the transfer synchronizing signal to the PCI interface 724. The PCI interface 724 refers to the transfer synchronizing signal 74 to input data to and output data from a PCI bus, so that the data can be transmitted between a computer operating in an asynchronous manner and a VTR operating in a synchronous manner.

The above-mentioned procedure for transmitting the data will be more specifically described by using a timing chart in FIG. 8 and FIG. 7 and an embodiment of a method for transmitting data according to the present invention will be described at the same time. Herein, a case where data is transmitted from a VTR is described as an example. Incidentally, when the data is transmitted to the VTR, the data can be also transmitted by using a similar procedure to that described above. In this case, it is to be understood that the addresses created in the list 13 are those of the start of data transfer, as stated above.

A pulse 81 is equivalent to the frame synchronizing signal 73 and generated every 33.3 ms or so. During this period, data 82 for four frames is outputted from the 4×speed DVC deck 71 and transferred to the FIFO 723 through the FIFO 721 and the bit width converting interface 722. The bit width converting interface 722 refers to the pulse 81 and generates a pulse 83. The pulse 83 is equivalent to the transfer synchronizing signal 74. When the PCI interface 724 receives a transfer request signal 86 from a CPU 5, the PCI interface 724 transfers data 841 to the PCI bus 4 simultaneously with the detection of the pulse 83. The data 841 shown in FIG. 8 includes a plurality of divided data blocks located within a range of the amount of data which can be transmitted in one unit transfer. At this time, the PCI interface 724 refers to the list 13 in the memory 3 and transfers the data having a prescribed capacity or size assigned to each of the data blocks as one unit to the designated address of the data area 7 in the memory 3. When the transfer of the plurality of data blocks to respective addresses which corresponds to one transfer request signal is completed, the PCI interface 724 generates an interrupt pulse 851. The CPU 5 detects the interrupt signal to thereby complete one transfer corresponding to one transfer request signal. A software 6 recognizes the size of the data whose transfer is completed. When the data having a necessary size or capacity is not completely transmitted, the software 6 forms again a list 13 to carry out a next transfer request. Upon receipt of the next request, data 842 and an interrupt pulse 852 seen in FIG. 8 are transferred in the same way as that described above. This procedure is repeated so that the transmission of data from the VTR 1 can be realized.

Figure 9A:
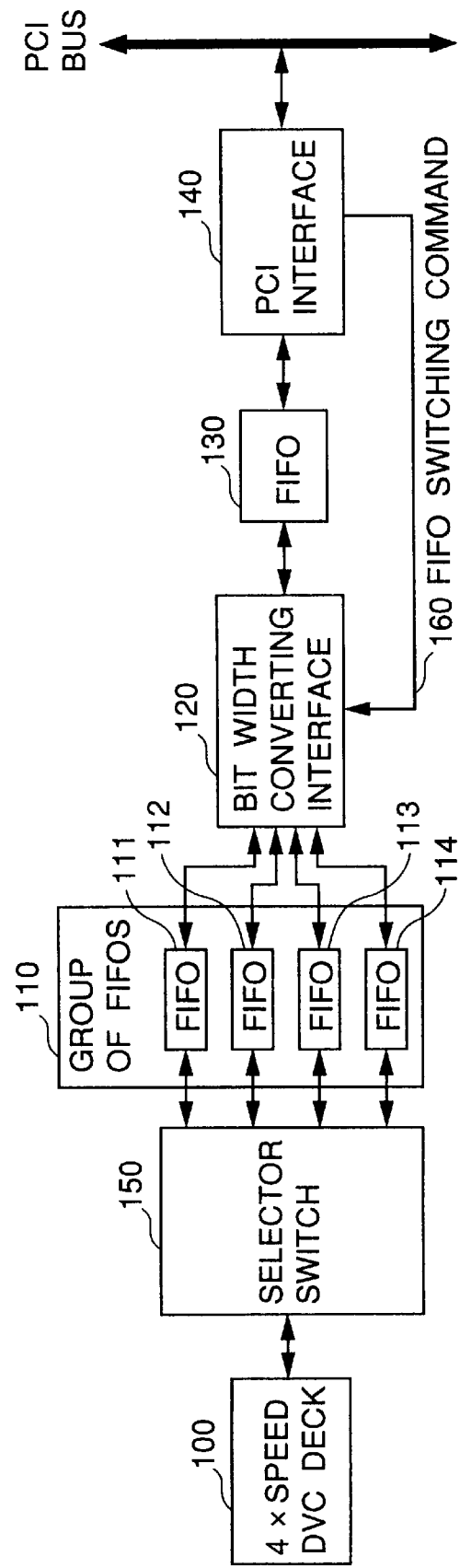
FIG. 9(A) is a block diagram of a first example illustrating other configuration in the fifth embodiment.
Figure 9B:
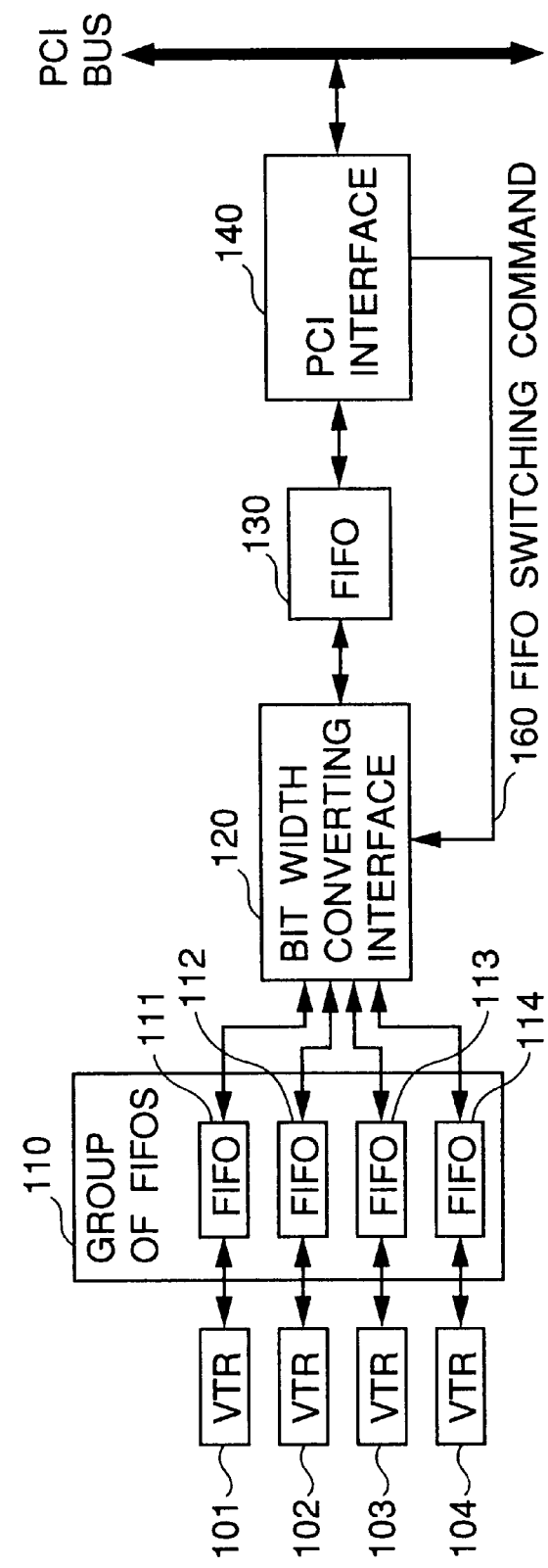
FIG. 9(B) is a block diagram of a second embodiment illustrating other configuration in the fifth embodiment.

In FIG. 7, although one FIFO 721 is employed, it is to be recognized that a selector switch 150 and a group of four FIFOs including FIFO 111 to FIFO 114 may be provided, as illustrated in FIG. 9(A), the FIFOs may be switched for each frame or data may be assigned to the FIFOs 111 to 114 to transfer the data in accordance with a specific procedure. Otherwise, as illustrated in FIG. 9(B), the FIFOs 111 to 114 may be connected to a plurality of VTRs 101 to 104. At this time, a PCI interface 140 sends information as to which FIFO the data is to be inputted to or outputted from and what bytes of data are inputted to or outputted from, to a bit width converting interface 120 as an FIFO switching command 160. Thus, the data is inputted and outputted between the group 110 of the FOFOs and an FIFO 130. The FIFO switching command 160 may be directly outputted to the bit width converting interface 120 from the PCI interface 140, as shown in FIGS. 9(A) and 9(B), or may be outputted to the bit width converting interface 120 through the FIFO 130 from the PCI interface 140 as in the case of the data.

Further, although the frame synchronizing signal is outputted once from the 4×speed DVC deck for the period of one frame, where the bit width converting interface is utilized so as to meet the frame synchronizing signals, it may be outputted a plurality of times for the period of one frame.

In the list 13, one block 200 comprises the first address 201 of the end of data transfer, a data transfer size 202 and a transfer command 203 as shown in FIG. 10. The first address 201 and the data transfer size 202 are similar to those shown in FIG. 2 in the second embodiment. The transfer command 203 includes information such as a transfer direction (a direction for transferring data from the VTR 1 to the memory 3 or a direction opposite thereto), as to each time of what kB an interrupt signal is generated, or the switching of the above-mentioned FIFOs.

For example, the address 201 of the end of data transfer and the data size 202 are expressed by decimal numbers. In the transfer command 203, as shown in FIG. 11, one bit 211 at the left end indicates a flag showing whether an interrupt is generated or not after a transfer instructed in the block 200 is completed (If the interrupt is generated, 1 is issued, and if the interrupt is not generated, 0 is issued). A second one bit 212 from the left end indicates a flag showing a direction for transmitting data (If the data is transmitted from the VTR to the memory, 1 is issued, and otherwise, 0 is issued). Third and fourth two bits 213 from the left end indicate the numbers (0 to 3) of the FIFOs. At this time, when the data of 60 kB which is the amount of data capable of being transferred at that time is divided into data blocks with the size of 4 kB and the divided data blocks are transferred to an area including the addresses of the end of data transfer of 0 to 60000 in the memory 3 from the VTR, such a list as shown in FIG. 12 is to be formed. In this connection, information that a data unit which can be transferred at that time is 60 kB is a value got from the function prepared for the operating system as mentioned before.

Parenthetically, the data of 60 kB is divided into the data blocks respectively having the size of 4 kB in order to easily understand an instance in which the data is rearranged as will be described below. Since the amount of data which can be transferred is 60 kB, it is to be noted that only one data block of 60 kB may be utilized without difficulty.

In the above-mentioned example, although the construction of the data block is formed as illustrated in FIG. 11, it is to be understood that the data block may be constructed in any sequence or any form so long as the construction of the data block includes the address of the end of data transfer, the transfer data size and the required command.

Figures 13A, 13B:
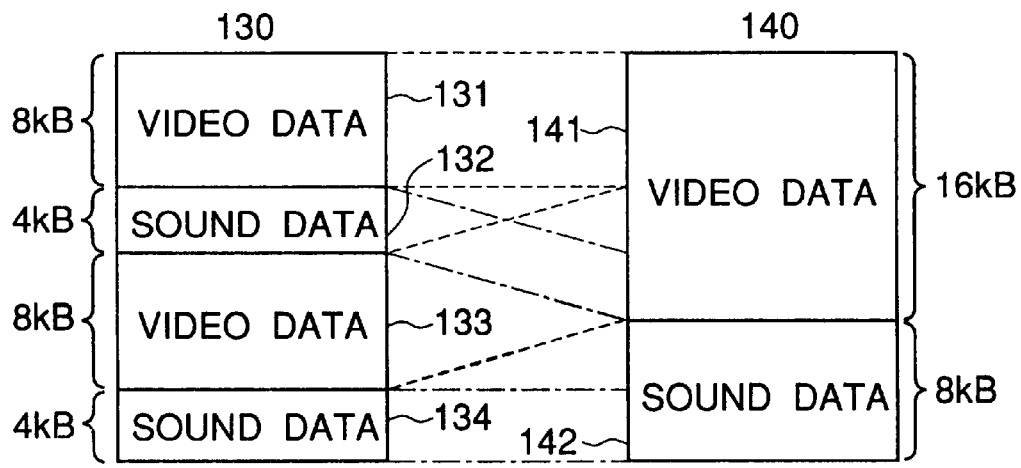
FIG. 13(A) is a block view of data obtained by rearranging data in the fifth embodiment.
FIG. 13(B) is a view showing a configurational example of the list 13 in accordance with the rearrangement of data in the fifth embodiment.

FIG. 13 is an explanatory view for explaining a method for changing the arrangement of data.

The arrangement of the data inputted to or outputted from the VTR and the data inputted to and outputted from the memory can be changed by using the list employed for transferring the data. FIG. 13 (A) shows an example of the method for rearranging the data. In FIG. 13 (A), data 130 is inputted to or outputted from the VTR, and data 140 is inputted to or outputted from the memory, respectively. The data 130 comprises video data parts 131 and 133 with the size of 8 kB, and sound data parts 132 and 134 with the size of 4 kB. The video data parts and the sound data parts are alternately arranged in the form of the data 130. The data 140 comprises a video data part 141 with the size of 16 kB and a sound data part 142 with the size of 8 kB. At this time, a list as illustrated in FIG. 13 (B) is created, so that the data is temporarily sent to a card memory from the VTR, and when the data is transmitted from the card memory to a main memory, the arrangement of the video data and the sound data can be varied during the transmission of the data. Therefore, since it is not necessary to change the arrangement of the data in the main memory, which is different from the prior art, a processing time after the data is transmitted to the main memory can be saved. Herein, the arrangement of the data shown in FIG. 13 is simplified for readily understanding it.

On the other hand, also when the data is transmitted in an opposite direction to the above, in other words, when the data is transmitted from the main memory to the card memory, the arrangement of the video data and the sound data can be modified in the course of its transmission in accordance with a fundamentally equal manner. However, when the data is transmitted in the opposite direction, the above mentioned processing time after the data is transmitted is not saved, but a processing time before the transmission of the data can be saved.

Now, a description will be further made from the viewpoint that processing time before the data is transmitted can be decreased. Specifically stated, for instance, when the data is outputted from the computer to the VTR and the arrangement of the data needs to be changed, the data has been conventionally rearranged temporarily in the main memory of the computer, and then, outputted to the VTR through a card memory. Accordingly, before the data is transmitted from the main memory to the card memory, a time for a preparation processing to change the arrangement of the data has been needed.

According to the above-mentioned embodiment or the fifth embodiment, even when the data is transmitted in the opposite direction, that is, from the main memory to the card memory, the processing time for changing the arrangment of the data before its transmission, which has been conventionally required, is not desirably needed.

Therefore, as mentioned above, when the data is transmitted in the opposite direction, the processing time before the transmission of the data can be advantageously saved.

Incidentally, although in the above mentioned embodiment, the arrangement of the data is varied between the VTR and the memory, it will be noted that the present invention is not limited thereto, and for example, the arrangement of the data transmitted through a network can be varied between the memory and the network.

Further, a medium is created on which is recorded a program for carrying out the functions (or steps) of all or a part of the above-mentioned means (or steps) by the computer. The medium is utilized so that the functions of various kinds of means (or steps) mentioned above can be simply performed by the computer.

An apparatus for transmitting data according to each of the above-mentioned embodiments is a data transmitter for transmitting data including at least one of video data, sound data and/or auxiliary data as one component comprising: input and output means for inputting and outputting data; memory means for storing the data, transmitting means for transmitting the data between the input and output means and the memory means; first control means for controlling the transmission of the data between the input and output means and the memory means; second control means for controlling the input and output means, the memory means and the first control means and means for detecting the amount of data which can be transferred during a prescribed period through the transmitting means, dividing the data into a plurality of data blocks respectively having the size or capacity which does not exceed the amount of transferable data and transmitting the data blocks. Thus, the above stated objects can be achieved.

Further, according to one of the embodiments, the list having a plurality of divided data blocks respectively having the size or capacity which does not exceed the amount of data which can be transferred is formed and means for transferring the data in accordance with the contents of the list are provided.

Further, according to one of the embodiments, the above-mentioned input and output means comprises a first buffer for temporarily storing the data, a second buffer for temporarily storing the data having a bit width different from that of the data in the first buffer, a first interface for converting the bit width of the data between the first buffer and the second buffer and inputting and outputting the data and a second interface for inputting and outputting the data between the second buffer and the transmitting means in accordance with a signal from the transmitting means.

Still further, according to another embodiment, a data input and output device connected to the transmitting means is further included and the data is recorded and reproduced relative to the data input and output device.

Still further, according to another embodiment, the data input and output device generates a first synchronizing signal, the first interface inputs and outputs the data synchronously with the first buffer in accordance with the synchronizing signal and further generates a second synchronizing signal relative to the second interface, and the second interface inputs and outputs the data synchronously with the transmitting means in accordance with the second synchronizing signal and further inputs the data to and outputs the data from the transmitting means when a data transfer is requested from the transmitting means.

According to other embodiment, the data input and output device generates one synchronizing signal during the period of one frame, and further, inputs or outputs the data for a plurality of integer number of frames for the period of one frame.

Further, according to other embodiment, the data input and output device is a recording and reproducing device capable of recording and reproducing the data of a DVC form at a speed four times as fast as an ordinary speed.

According to other embodiment, the input and output means is an interface for converting the data of a DVC format into the data of a PCI bus form or the data of the PCI bus form into the data of the DVC format.

Further, according to other embodiment, the input and output means is an interface for converting data transmitted through a network into the data of a PCI bus form or the data of the PCI bus form into the data transmitted through the network.

According to other embodiment, the memory means is a main memory of a computer.

Further, according to other embodiment, the transmitting means is a PCI bus.

Still further, according to other embodiment, the first control means is a microprocessor.

According to other embodiment, the second control means is an application software, a device driver or an operating system.

Further, according to other embodiment, the list can be made access to from the input and output means.

Still further, according to other embodiment, the list has contents in which the arrangement of data inputted to and outputted from the input and output means or the second interface is so constructed as to be different from that of data inputted to and outputted from the memory means.

Additionally, according to other embodiment of the present invention, the list includes the contents having a command for controlling the input and output means or the second interface.

According to the construction of the present invention stated above, the data can be efficiently transmitted at high speed when the data to be transmitted is inputted or outputted through the network, or when the data is inputted or outputted by the recording and reproducing device such as the VTR and so on, without depending on a system configuration. Further when other work such as an editing operation is carried out during the transmission of the data, an error in fetching the data does not occur and therefore, the reliability of the invention is improved.

As apparent from the foregoing description, according to the above mentioned embodiments of the present invention, such advantages or effects as described below can be realized.

(1) The transfer capacity pertinent to a system can be employed at its maximum without depending on a system configuration.

(2) A high speed transmitter can be realized which can be connected to a high speed recording and reproducing VTR, a plurality of VTRs or a network and is high in its efficiency and reliability without dropping data out of frames or the like.

(3) The arrangement of data can be changed between the VTR or the network and the memory and the data does not need to be rearranged in the memory, so that a processing time can be shortened.

What is claimed is:

1. An apparatus for transmitting data comprising:

input and output means for inputting and outputting data including at least one of i) video data, ii) audio data, and iii) auxiliary data as first data;

a memory for storing the first data;

transmitting means for transmitting the first data between said input and output means and said memory;

a first controller for controlling the transmission of the first data between said input and output means and said memory; and a second controller for i) detecting an amount of data which can be transferred as one unit transfer through said transmitting means when said first data is transmitted, and ii) controlling at least said input and output means, said memory and said first controller so as to divide the first data into divided data blocks, each divided data block having a size which does not exceed said amount of data, and transmit at least one of the divided data blocks as said one unit to be transferred when the first data exceeds said amount of data;

list forming means for forming a list showing at least the respective amount of data of the data blocks and at least one of a) a direction of data transfer of said data blocks; and b) where said data blocks are to be sent; and transfer means in one of i) the input and output means and ii) the second controller for transferring the divided data blocks to said transmitting means based on a content of said list.

2. An apparatus for transmitting data according to claim 1, wherein said input and output means comprises:

a first buffer for temporarily storing said first data, said first buffer having a first bit width;

a second buffer for temporarily storing said first data having a second bit width different from the first bit width;

a first interface for converting the first bit width of the first buffer to the second bit width of the second buffer as converted first data and inputting and outputting the converted first data; and a second interface for inputting and outputting the converted first data between the second buffer and the transmitting means in accordance with a signal from the transmitting means.

3. An apparatus for transmitting data according to claim 1, wherein said input and output means comprises:

a first buffer for temporarily storing said first, data said first buffer having a first bit width;

a second buffer for temporarily storing said first data having a second bit width different from the first bit width;

a first interface for converting the first bit width of the first buffer to the second bit width of the second buffer as converted first data and inputting and outputting the converted first data; and a second interface for inputting and outputting the converted first data between the second buffer and the transmitting means in accordance with a signal from the transmitting means.

4. An apparatus for transmitting data according to claim 2, wherein said input and output means is also connected to an external data input and output device and said first data is at least one of i) recorded data on said data input and output device and ii) reproduced by said data input and output device.

5. An apparatus for transmitting data according to claim 1, wherein said input and output means is also connected to an external data input and output device and said first data is at least one of i) recorded data on said data input and output device and ii) reproduced by said data input and output device.

6. An apparatus for transmitting data according to claim 3, wherein said input and output means is also connected to an external data input and output device and said first data is at least one of i) recorded data on said data input and output device and ii) reproduced by said data input and output device.

7. An apparatus for transmitting data according to claim 4, wherein said data input and output device generates a first synchronizing signal;

said first interface i) inputs and outputs the data synchronously with the first buffer in accordance with the first synchronizing signal and ii) generates a second synchronizing signal; and said second interface inputs and outputs the data synchronously with said transmitting means in accordance with the second synchronizing signal responsive to a data transfer request from the transmitting means.

8. An apparatus for transmitting data according to claim 5, wherein said data input and output device generates a first synchronizing signal;

said first interface i) inputs and outputs the data synchronously with the first buffer in accordance with the first synchronizing signal and ii) generates a second synchronizing signal; and said second interface inputs and outputs the data synchronously with said transmitting means in accordance with the second synchronizing signal responsive to a data transfer request from the transmitting means.

9. An apparatus for transmitting data according to claim 6, wherein said data input and output device generates a first synchronizing signal;

said first interface i) inputs and outputs the data synchronously with the first buffer in accordance with the first synchronizing signal and ii) generates a second synchronizing signal; and said second interface inputs and outputs the data synchronously with said transmitting means in accordance with the second synchronizing signal responsive to a data transfer request from the transmitting means.

10. An apparatus for transmitting data according to claim 4, wherein N is an integer greater than or equal to 2, said data input and output device i) generates one synchronizing signal during a one frame period and ii) inputs and outputs the first data for N frames during the one frame period.

11. An apparatus for transmitting data according to claim 5, wherein N is an integer greater than or equal to 2, said data input and output device i) generates one synchronizing signal during a one frame period and ii) inputs and outputs the first data for N frames during the one frame period.

12. An apparatus for transmitting data according to claim 6, wherein N is an integer greater than or equal to 2, said data input and output device i) generates one synchronizing signal during a one frame period and ii) inputs and outputs the first data for N frames during the one frame period.

13. An apparatus for transmitting data according to claim 4, wherein said data input and output device is a recording and reproducing device capable of recording and reproducing the data in a DVC format at a speed of at least 480 k bytes in a one frame period.

14. An apparatus for transmitting data according to claim 7, wherein said data input and output device is a recording and reproducing device capable of recording and reproducing the data in a DVC format at a speed of at least 480 k bytes in a one frame period.

15. An apparatus for transmitting data according to claim 5, wherein said data input and output device is a recording and reproducing device capable of recording and reproducing the data in a DVC format at a speed of at least 480 k bytes in a one frame period.

16. An apparatus for transmitting data according to claim 8, wherein said data input and output device is a recording and reproducing device capable of recording and reproducing the data in a DVC format at a speed of at least 480 k bytes in a one frame period.

17. An apparatus for transmitting data according to claim 6, wherein said data input and output device is a recording and reproducing device capable of recording and reproducing the data in a DVC format at a speed of at least 480 k bytes in a one frame period.

18. An apparatus for transmitting data according to claim 9, wherein said data input and output device is a recording and reproducing device capable of recording and reproducing the data in a DVC format at a speed vat least 480 k bytes in a one frame period.

19. An apparatus for transmitting data according to claim 1, wherein said input and output means is an interface for converting one of i) data of a DVC form into data of a PCI bus form and ii) data of the PCI bus form into data of the DVC form.

20. An apparatus for transmitting data according to claim 1, wherein said input and output means is an interface for converting one of i) data transmitted through a network into the data of a PCI bus form and ii) the data of the PCI bus form into the data transmitted through the network.

21. An apparatus for transmitting data according to claim 1, wherein said memory is a main memory of a computer.

22. An apparatus for transmitting data according to claim 1, wherein said transmitting means is a PCI bus.

23. An apparatus for transmitting data according to claim 1, wherein said first controller is a microprocessor.

24. An apparatus for transmitting data according to claim 1, wherein said second controller employs one of i) an application software, ii) a device driver and iii) an operating system.

25. An apparatus for transmitting data according to claim 1, wherein said list is formed in said memory or said input and output means.

26. An apparatus for transmitting data according to claim 1, wherein said list can access said input and output means.

27. An apparatus for transmitting data according to claim 1, wherein said list includes address information of the end of data transfer of the data blocks in addition to said respective amount of data when the respective data blocks are transmitted from said input and output means to said memory, and also includes the address information of the start of data transfer of the data blocks in addition to said respective amount of data when the respective data blocks are transmitted from the memory to said input and output means.

28. An apparatus for transmitting data according to claim 1, wherein said list contains a command for controlling at least one of i) said input and output means and ii) said second controller.

29. A medium for use with a computer on which a program is recorded for carrying out the functions of at least one of the respective means according to claim 1.

30. An apparatus for transmitting data according to claim 1, wherein said list indicates to which of a plurality of FIFO memories each of said data blocks are to be sent.

31. An apparatus for transmitting data according to claim 30, wherein said FIFO memories are arranged in parallel between said input and output means and said memory.

32. An apparatus for transmitting data comprising:

input and output means for inputting and outputting data including at least one of i) video data, ii) audio data, and iii) auxiliary data as first data;

a memory for storing the first data;

transmitting means for transmitting the first data between said input and output means and said memory;

a first controller for controlling the transmission of the first data between said input and output means and said memory; and a second controller for i) detecting an amount of data which can be transferred as one unit transfer through said transmitting means when said first data is transmitted, and ii) controlling at least said input and output means, said memory and said first controller so as to divide the first data into divided data blocks, each divided data block having a size which does not exceed said amount of data, and transmit at least one of the divided data blocks as said one unit to be transferred when the first data exceeds said amount of data;

wherein said first data has different orders of arrangement between said input and output means and said memory, respectively.

33. An apparatus for transmitting data according to claim 32, further comprising:

list forming means for forming a list showing at least the respective amount of data of the data blocks and at least one of a) a direction of data transfer of said data blocks; and b) where said data blocks are to be sent; and transfer means in one of i) the input and output means and ii) the second controller for transferring the divided data blocks to said transmitting means based on a content of said list.

34. An apparatus for transmitting data according to claim 33, wherein said input and output means comprises:

a first buffer for temporarily storing said first data, said first buffer having a first bit width;

a second buffer for temporarily storing said first data having a second bit width different from the first bit width;

a first interface for converting the first bit width of the first buffer to the second bit width of the second buffer as converted first data and inputting and outputting the converted first data; and a second interface for inputting and outputting the converted first data between the second buffer and the transmitting means in accordance with a signal from the transmitting means.

35. An apparatus for transmitting data according to claim 33, wherein said input and output means comprises:

a first buffer for temporarily storing said first data, said first buffer having a first bit width;

a second buffer for temporarily storing said first data having a second bit width different from the first bit width;

a first interface for converting the first bit width of the first buffer to the second bit width of the second buffer as converted first data and inputting and outputting the converted first data; and a second interface for inputting and outputting the converted first data between the second buffer and the transmitting means in accordance with a signal from the transmitting means.

* * * * *

UNITED STATES PATENT AND TRADE MARK OFFICE
CERTIFICATE OF CORRECTION

PATENT NO. : 6,047,340
DATED : April 4, 2000
INVENTOR(S) : Hiroshi Kase, Shinji Hamai and Yoshihiro Morioka It is certified that error appears in the above-identified patent and that said Letters Patent is hereby corrected as shown below:

Cover page, item [56] References Cited, Foreign Patent Documents, insert

--09251713  9/1997  Japan
  8-176934  7/1996  Japan--.

Column 15, line 41, "vat" should be --at--.

Signed and Sealed this

Fifteenth Day of May, 2001

Attest:

NICHOLAS P. GODICI

Attesting Officer      Acting Director of the United States Patent and Trademark Office